United States Patent

[11] 3,612,746

| [72] | Inventor | Edward L. Sankey<br>New Berlin, Wis. |
|---|---|---|
| [21] | Appl. No. | 799,365 |
| [22] | Filed | Feb. 14, 1969 |
| [45] | Patented | Oct. 12, 1971 |
| [73] | Assignee | RTE Corporation<br>Waukesha, Wis. |

[54] CABLE-SPLICING DEVICE FOR HIGH-VOLTAGE CABLES
5 Claims, 2 Drawing Figs.

[52] U.S. Cl............................................. 174/73 R,
156/49, 174/88 R
[51] Int. Cl........................................... H02q 15/08
[50] Field of Search............................................. 174/73, 84,
88, 88.2; 156/49

[56] References Cited
UNITED STATES PATENTS

| 2,695,853 | 11/1954 | Foreit............................ | 156/49 |
| 3,297,819 | 1/1967 | Wetmore........................ | 156/49 X |
| 3,376,541 | 4/1968 | Link............................... | 174/73 X |
| 3,485,935 | 12/1969 | Kreuger.......................... | 174/73 X |

*Primary Examiner*—Laramie E. Askin
*Attorneys*—Ronald E. Barry and James E. Nilles

ABSTRACT: Disclosed herein is a preformed unitary self-sealing device for making an insulated high-voltage splice between two solid insulated cables having a connector connected to the electrical conductors of the cables. The preformed device comprises a conductive sleeve embedded in a sleeve of elastomeric material. The conductive sleeve electrically engages the connector and bridges the connection.

PATENTED OCT 12 1971 3,612,746

Inventor
Edward L. Sankey
By
Wheeler, Wheeler, House & Clemency
Attorneys

CABLE-SPLICING DEVICE FOR HIGH-VOLTAGE CABLES

BACKGROUND OF THE INVENTION

High-voltage cables are spliced by removing a portion of the cable semicon from the cable insulation to expose the insulation and removing a portion of the cable insulation from the conductor to expose the conductor. A metallic connector is then routinely crimped to the exposed cable conductors and insulation is wrapped about the connector and the exposed portions of the cable insulation to insulate and seal the connection.

SUMMARY OF THE INVENTION

The invention disclosed herein provides an insulated cable splice, both in terms of the device and method, by using a unitary self-sealing device. The unitary insulating device includes an electrically conductive sleeve of resilient elastomeric material embedded within a sleeve of resilient elastomeric insulating material with an axially extending opening through the insulating sleeve having a diameter smaller than the diameter of the exposed solid insulation on the high-voltage cables. The voltage gradient across the connection is reduced to a minimum by providing the conductive sleeve with a length sufficient to enclose the connector and lap the exposed portions of the cable insulation. The method includes the step of mounting the insulating device on the end of one of the cables prior to connecting the metallic connector to the exposed conductors. The insulating device is then moved over the metallic connector with the resilient electrically conductive member lapping the exposed cable insulation on each of the cables. The insulating sleeve may be formed from a heat-shrinkable material with an opening larger than the diameter of the solid cable insulation and then heat shrinking the sleeve onto the cable to form a watertight seal.

Other objects and advantages of the present invention will become apparent from the following detailed description when read in connection with the accompanying drawings in which.

DETAILED DESCRIPTION OF THE INVENTION

Figure 1:
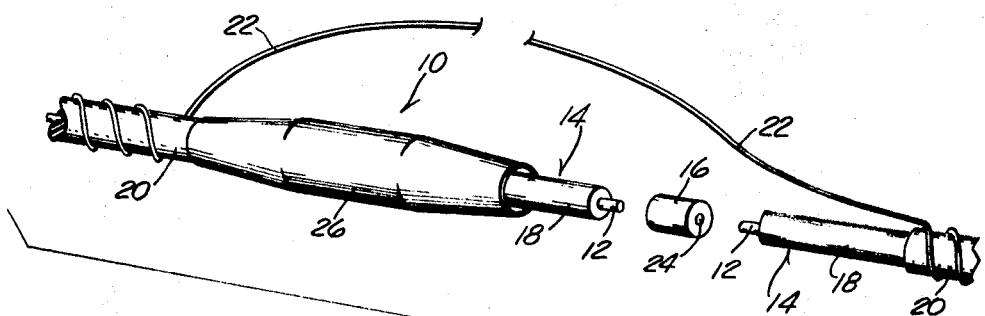
FIG. 1 is an exploded view in perspective of the cable-splice-insulating device mounted on one of the high-voltage cables.
Figure 2:
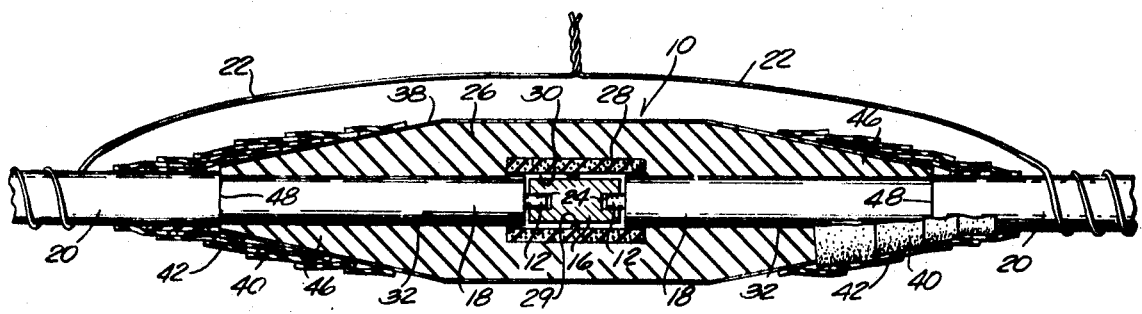
FIG. 2 is a side view partly in section showing the insulating device mounted on a spliced cable.

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

The preformed unitary cable insulating device 10 of this invention is used to insulate and seal a high-voltage cable connection made by joining the exposed electrical conductors 12 at the ends of the high-voltage cables 14 by means of a barrel-type metallic connector 16.

High-voltage cables 14 conventionally include an electrical conductor 12 insulated by a solid insulation 18 which is enclosed in a semiconductive covering 20 and wrapped in a concentric neutral 22. The end of each high-voltage cable 14 is prepared for splicing by unwrapping the concentric neutral 22 and removing a portion of the semiconductive covering 20 to expose a section of the solid insulation 18 at the end of the cable 14. A portion of the insulation 18 is removed from the end of each cable to expose a predetermined length of the conductor 12. The exposed conductors 12 are connected by means of a metallic connector 16 having openings 24 at each end to receive the exposed conductors 12. The connector 16 is crimped to the conductors 12 to make a permanent connection.

The splice or connection is sealed and insulated by mounting the cable-insulating device 10 on the exposed portions of the insulation 18. The insulating device 10 includes an outer insulating sleeve or tube 26 and an electrically conductive inner sleeve 28. The inner sleeve or tube 28 is molded from an electrically conductive elastomer, such as ethylene-propylene terpolymer sold under the name "Nordel" admixed with conductive material for example lampblack, graphite, or carbon black, such as Conductex S.C. (Columbia Carbon Corp., in the form of a sleeve having an axially extending opening 30. The inner sleeve 28 should have a length sufficient to lap the exposed cable insulation 18 to enclose the connector 16. Since the inner member is electrically conductive, the electrical potential of the inner member will be raised to essentially the same voltage as is carried by the connector 16 and conductor 12, reducing the voltage gradient to a minimum. The inside diameter of the inner sleeve 28 can be made larger than the diameter of the solid insulation 18 of the cable. Means can be provided within the inner sleeve 28 to contact the connector in the form of a radially inwardly extending member integral with said inner sleeve 28, such as a tit 29.

The outer sleeve 26 is formed or molded around the inner sleeve 28 to form a void-free unitary structure and is made of an appropriate elastomeric material, such as an ethylene-propylene terpolymer which has an electrically insulating characteristic. The sleeve 26 has a thickness sufficient to provide insulation around the inner sleeve 28 substantially equal to the solid insulation 18 of the cable. The sleeve 26 extends outwardly from each end of the inner sleeve 28 tapering to merge with the cable insulation 18. The outer sleeve 26 has an axially extending opening 32 at each end having an inside diameter smaller than the diameter of the cable insulation 18.

The splice is sealed by means of the reduced diameter of the opening 32 in the sleeve 26. The outer sleeve 26 and the inner sleeve 28 are forced onto he exposed portion of the insulation 18 at each end of the cable and are sufficiently resilient to expand to the diameter of the cable insulation. The tension produced in the housing on expanding to the diameter of the cable results in a watertight seal on each side of the connection.

A watertight seal can also be formed by making the sleeve 26 of a material that can be shrunk after the sleeve 26 is in position on the cable. This can be accomplished by heating the sleeve 26 after molding and stretching the elastic material to increase the size of the opening 32. The sleeve 26 is then allowed to cool. After the sleeve is mounted on the cable, the sleeve is reheated to allow the material to shrink back to its molded dimensions. The sleeve 26 can also be soaked in toluene to swell the sleeve and after mounting on the cable, air-dried to shrink.

The splice is shielded by means of a semiconductive coating or sleeve 38 provided on the outer surface of the outer sleeve 26. The coating 38 may be applied to the outer sleeve 26 by spraying with a conductive paint or dipping the outer sleeve in a conductive paint or by molding the conductive outer sleeve 38 on the sleeve 26. Shielding of the splice is completed by means of a semiconductive tape 40 wrapped around the tapered ends of the sleeve 26 and around the semiconductive covering 20 on the cable. The semiconductive tape 40 is protected from weathering by means of an insulating tape 42 wrapped over the semiconductive tape 40. A stress cone is provided at each end of the splice by means of the tapered ends 46 formed at each end of the housing 26.

The method of using the insulating device 10 to seal and insulate a connection formed between the ends of two insulated high-voltage cables includes the following steps:

Initially, the ends of the insulating cables 14 are prepared by unwinding the concentric neutral 22 from each end of cables 14. The cable is measured and cut to expose the conductor 12. The cable is again measured and cut to remove the semiconductive covering 20 and expose a portion of the cable insulation 18. The surface of the exposed insulation 18 is wiped with a silicon grease which acts as a lubricant for the insulating device 10.

The next step, which is considered one of the novel steps in this method, involves the sliding of the sleevelike insulating device 10 onto the exposed cable insulation 18 and semiconductive covering 20 on the end of one of the cables 14 until the exposed conductor 12 projects outwardly from the insulating device 10 as seen in FIG. 1. The sleeve 26 is resilient and will expand sufficiently to allow the insulating device to slide over the cable insulation 18 and semiconductive covering 20.

The metallic barrel connector 16 is crimped to the exposed conductors 12 on each of the cables 14 by inserting the conductor 12 into the openings 24 at each end of the connector 22 and crimping the connector to form a permanent connection.

Another step, which is considered novel in this method, is sliding or telescoping of the device 10 over the connector 16 and onto the exposed cable insulation 18 on the other cable 14. The insulating device 10 is moved far enough to locate the connector 16 at approximately the midpoint of the device 10 with the inner sleeve 28 lapping the exposed cable insulation 18 on each side of the connector 22. This is determined by accurately measuring and cutting the cable 14 to expose predetermined lengths of cable insulation 18 and conductors 12. The outer sleeve 26 is moved far enough to abut the end 48 of the semiconductive covering 20. The other end of the sleeve 26 should then be clear of the semiconductive covering 20 on the end of the other cable 14. If the outer sleeve 26 is made of a shrinkable material, it should be heated or allowed to air-dry to form a tight fit.

Shielding of the splice is completed by wrapping the semiconductive tape 40 around the semiconductive coating 38 on the outer sleeve 26 and the semiconductive covering 20 on the cable to provide a continuity of semiconductive material around the outer surface of the insulating device 10. The splice is completed by wrapping insulating tape 42 over the semiconductive tape 40 and connecting the concentric neutrals 22.

One of the principal advantages in using this method to insulate a cable splice is the ability to completely seal and insulate the splice using a unitary housing. No special wrapping techniques are required since the housing is self-sealing.

What is claimed is:

1. A self-sealing insulating device for making an insulated high-voltage cable splice between two high-voltage cables electrically connected by a metallic connector, each cable having a portion of the cable insulation exposed, said device unitarily comprising, an outer sleeve consisting of a resilient elastomeric insulating material and having an axially extending opening to receive the exposed portions of the cable insulation at the ends of the cables, and an inner sleeve consisting of resilient elastomeric electrically conductive material having an axially extending opening to enclose the connector, and means integral with said inner sleeve for electrically engaging the connector.

2. A device according to claim 1 wherein the inner sleeve has a length sufficient to lap the exposed cable insulation.

3. A device according to claim 1 wherein said electrically engaging means comprises a radially inwardly extending member formed as an integral part of said inner sleeve.

4. A device according to claim 1 wherein said opening in said outer sleeve is smaller than the diameter of the exposed cable insulation and said opening in said inner sleeve is greater than the diameter of said exposed cable insulation.

5. A self-sealing insulating device according to claim 1 wherein said outer sleeve is formed of a shrinkable material.